United States Patent
Miyamura et al.

(10) Patent No.: US 6,758,679 B2
(45) Date of Patent: Jul. 6, 2004

(54) INSTALLATION INSTRUCTION CONVEYING DEVICE (ELECTRONIC COMPONENTS) MECHANICAL

(75) Inventors: Harold Miyamura, San Jose, CA (US); David Hishinuma, Fremont, CA (US); Junichi Kato, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/124,999

(22) Filed: Apr. 17, 2002

(65) Prior Publication Data

US 2003/0198937 A1 Oct. 23, 2003

(51) Int. Cl.[7] .............................................. G09B 19/00
(52) U.S. Cl. ...................... 434/379; 434/118; 434/382
(58) Field of Search ................................ 434/118, 219, 434/365, 369, 379, 382, 401; 283/45, 46, 115, 1, 81; 40/299.01, 312, 319, 336, 340

(56) References Cited

U.S. PATENT DOCUMENTS

| | | | | |
|---|---|---|---|---|
| 4,696,843 A | * | 9/1987 | Schmidt | 428/42.2 |
| 4,801,215 A | * | 1/1989 | Paffhausen et al. | 400/224 |
| 5,657,869 A | * | 8/1997 | Carroll, III | 206/451 |
| 5,682,140 A | * | 10/1997 | Christensen et al. | 340/540 |
| 5,732,464 A | * | 3/1998 | Lamont | 29/825 |
| 5,766,401 A | * | 6/1998 | Campbell et al. | 156/277 |
| 6,061,532 A | * | 5/2000 | Bell | 396/661 |
| 6,294,236 B1 | * | 9/2001 | Freedman | 428/40.1 |

OTHER PUBLICATIONS

MicroMax User Instructions [online], May 21, 2001.*
Posh Speaker Systems, Inc. Installation Guide [online], 2001.*
Capital Vending, Inc., "Replacement of NV–110 Validator in an Avanti Tube Charger" [online], Jul. 17, 2001.*
American Allergy Supply, "Battery Installation for th Duraneb 2000" [online], 2000.*
Laser Aiming Device Installation Guide [online], May 2001.*
Epson Black Printer Cartridge Refilling Instructions [online], Apr. 3, 2002.*
Installation Instructions: CU-8 [online], Feb. 6, 2001.*

* cited by examiner

*Primary Examiner*—Kurt Fernstrom

(57) ABSTRACT

An installation instruction conveying device. In one embodiment, the installation instruction conveying device is comprised of a first surface having instructions visibly disposed thereon for installing a component. The installation instruction conveying device is further comprised of a means for adhering said installation instruction conveying device to a component installation location. The installation instruction conveying device prevents the installation of the component at the component installation location unless the installation instruction conveying device is removed from said component installation location.

25 Claims, 8 Drawing Sheets

600

Providing a conveying device that displays installation instructions pertaining to installing a component at a component installation location. The conveying device is adapted to be disposed upon the component installation location, and when so disposed prevents said installation of the component at component installation location.
602

The conveying device is further adapted to be removed from the component installation location, thus allowing the installation of the component at the component installation location.
604

FIG. 6

INSTALLATION INSTRUCTION CONVEYING DEVICE (ELECTRONIC COMPONENTS) MECHANICAL

TECHNICAL FIELD

Embodiments of the present invention are related to providing instructions regarding installation procedures of electronic components.

BACKGROUND ART

Today, many companies currently manufacture and market components such as electronic and computer system components, e.g., integrated circuits, CPUs (central processing units), RAM (random access memory), and the like. Those companies conventionally rely upon the perceived ability of a technician to be cognizant of installation procedures regarding a particular component. It is quite common for those manufacturing companies to provide minimal instruction, if any, regarding the installation of a component.

A majority of electronic components that are adapted to be inserted into or coupled with a receiving component, such as a socket or slot on printed circuit board (also referred to as a motherboard), have a particular installation procedure associated therewith. For example, one RAM manufacturer can require a horizontal installation into a memory slot. Another RAM manufacturer can require an angled insertion into the slot, and then subsequently rotating the RAM to a locked position. Different electronic components can require different installation procedures.

In another example, many of the CPUs currently available require specific installation instructions. One type of CPU can require aligning the pins with the opening in the receiving component prior to insertion. Another CPU can require physically moving a locking mechanism, e.g., a lever, to enable insertion of the CPU into a socket. Other types of CPUs can have alternative methods of installation.

Further, today's electronic components are commonly smaller, faster, and have more processing power that those components before them. To provide proper connectivity, today's components have seen an increase in the number of connections, e.g., contacting elements, connecting pins, and the like. Because the number of connections has increased while the size of the component has been reduced, those connections, critical to the proper operation of an electronic component, are becoming more fragile and less resistant to damage due to improper insertion or coupling.

Additionally, improper installation or coupling of an electronic component into or with a receiving component can not only damage the electronic component being coupled or inserted, but can damage the socket into which the electronic component is coupled. Further, damage to the printed circuit board upon which the receiving component is disposed can be caused by improper installation of an electronic component.

It is noted that most electronic devices that are commonly inserted into a receiving component (socket), e.g., CPUs, memory chips, integrated circuits, generate heat, and the heat is then dissipated by a heat sink and/or a heat sink fan or an alternative means to dissipate heat. Because of the heat generated by a CPU and other electronic components when in operation, placing instructions upon the electronic device can caused an excess of heat to be retained, as the instructions can affect the efficiency with which the heat is dissipated. Further, placing the instructions upon the electronic component can also affect the coupling thereof, such that if the instructions are placed upon the contacting elements or pins, proper insertion or coupling can be affected.

Additionally, it is well known that during shipping and installation of a receiving component, whether or not predisposed upon a printed circuit board, minute particles of dust, metal shavings, and other materials can become lodged within the receiving component, thus also negatively affecting the insertion or coupling of an electronic component.

Hence, many electronic components are not provided with proper installation instructional material.

DISCLOSURE OF THE INVENTION

Thus, embodiments of the present invention are drawn to providing installation instructions for an electronic component that is to be installed into a receiving component. Embodiments of the present invention further provide installation instructions in such a manner as to require its removal thereof prior to installation of the electronic component. Embodiments of the present invention further provide a measure of protection against undesired particles entering a component adapted to receive the electronic component.

In one embodiment, an installation instruction conveying device is comprised of a first surface having instructions visibly disposed thereon for installing a component. The installation instruction conveying device is further comprised of a means for adhering the installation instruction conveying device to a component installation location. The installation instruction conveying device prevents the installation of the component at the component installation location unless the installation instruction conveying device is removed from the component installation location.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 6 is a flowchart showing the steps in a process of providing electronic component installation instructions in accordance with one embodiment of the present invention.

BEST MODES FOR CARRYING OUT THE INVENTION

An installation instruction conveyance device is described. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

The installation instruction conveyance device is, in one embodiment, a label that provides installation instructions related to an electronic component being installed into a receiving component, e.g., a CPU being installed into a CPU socket. The device is disposed upon the receiving socket and is viewed prior to installation. The device, when installed upon the receiving component, prevents installation of the electronic component into the receiving component until the device is removed.

Advantages of embodiments of the present invention, as will be shown, below, are that the installation instructions are conveniently located. Another advantage is the device provides a measure of protection against loose impediments being lodged in the receiving component. Additionally advantageous is the device mandates its removal prior to installation, thus requiring viewing of the installation instructions prior to installation, thus increasing the likelihood of a proper and correct installation.

Embodiments of the present invention are discussed primarily in the context of providing installation instructions for installing an electronic component into a receiving component, e.g., CPU into a CPU socket, or installing a memory chip into a memory slot. However, it is noted that embodiments of the present invention can be utilized by other electronic components that are adapted to be inserted into or coupled with a receiving component, including but not limited to CPUs and memory chips. Additionally, embodiments of the present invention are also well suited for use with components of a non-electronic nature that are configured to be inserted into or coupled with a receiving component.

Figure 1:
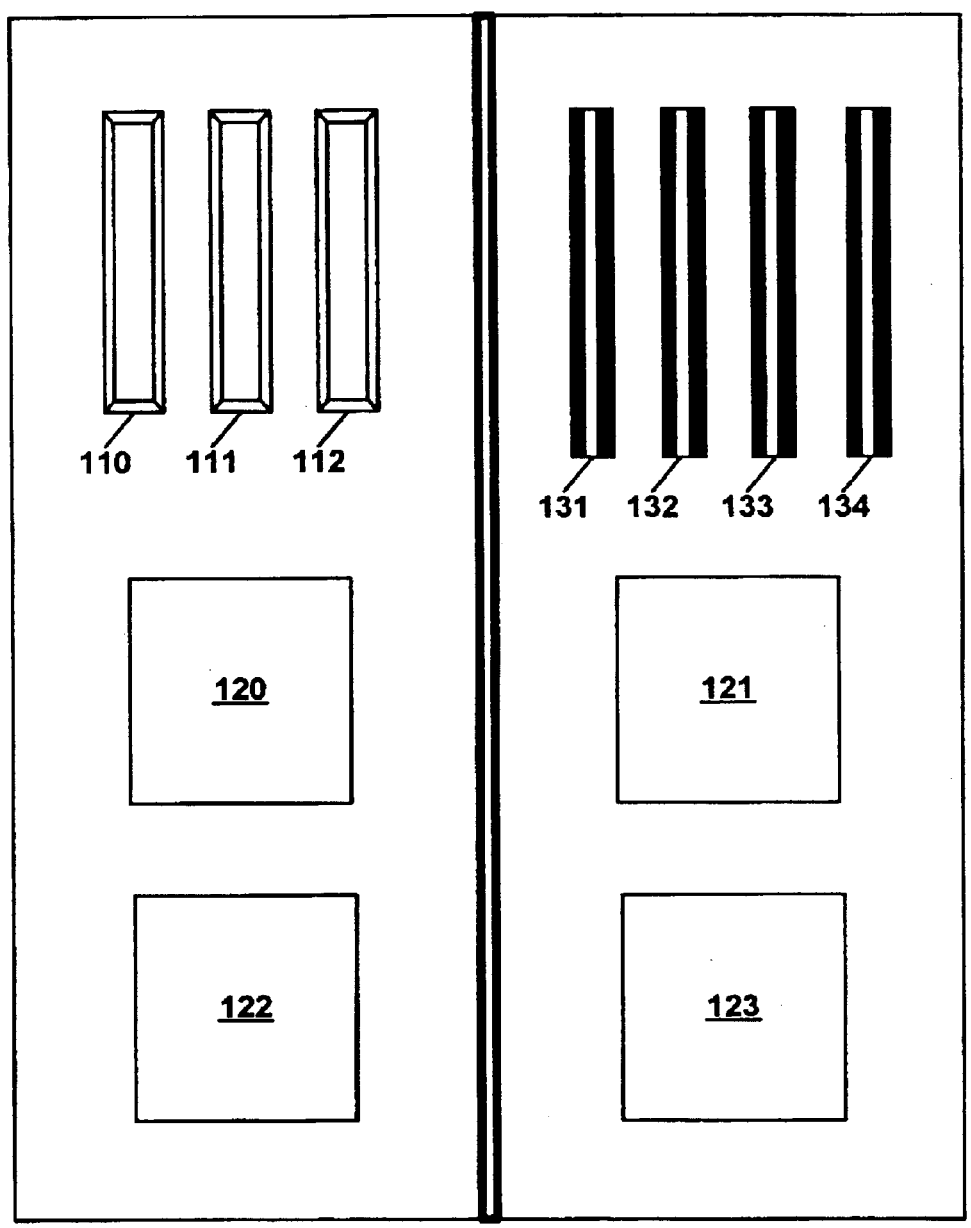
FIG. 1 is an illustration of a printed circuit board upon which a receiving component can be disposed in accordance with one embodiment of the present invention.

FIG. 1 is a block diagram illustrating an exemplary PCB 100 (printed circuit board, e.g., a motherboard) upon which embodiments of the present invention may be practiced. PCB 100 shows memory slots 110, 111, and 112. It is noted that PCB 100 can be configured with a greater number or fewer number of memory slots. Also shown are expansion slots 131–134, which are adapted to receive component cards, e.g., a network interface card (NIC), a video card, a sound card, and the like. It is noted that there can be a fewer number or a greater number of expansion slots disposed upon PCB 100. PCB 100 also shows CPU sockets 120, 121, 122, and 123. In the present example, PCB 100 is configured as a multi-processor PCB. In another example, PCB 100 can be configured with a fewer number or a greater number of CPU sockets. It is also noted that the shown locations of memory slots 110–112, expansion slots 131–134, and CPU sockets 121–124 is exemplary in nature and should not be construed as limiting with regard to position upon the PCB nor as to the quantity thereof.

Figure 2A:
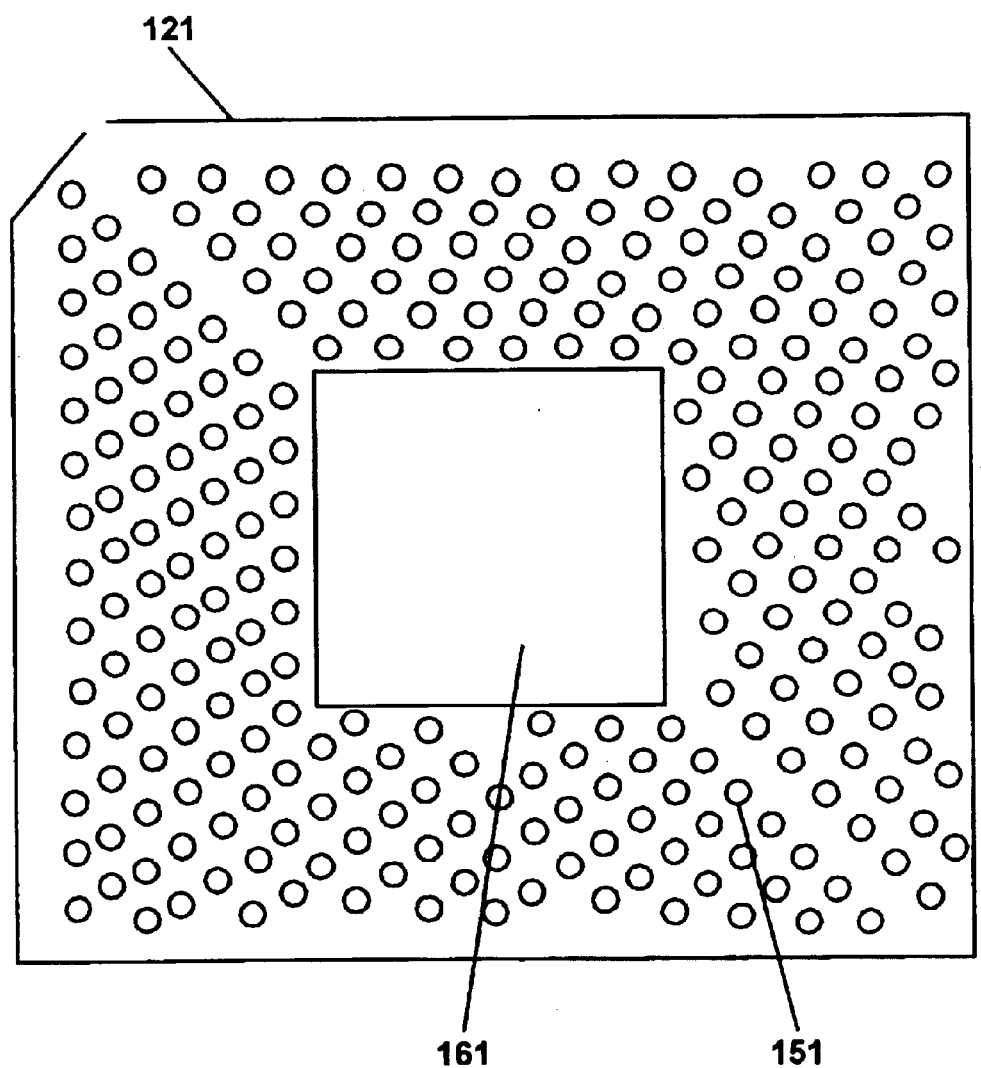
FIG. 2A is an illustration of a receiving component upon which embodiments of the present invention can be disposed in accordance with one embodiment of the present invention.

FIG. 2A is an expanded view of a CPU socket, e.g., CPU socket 121 of FIG. 1. CPU socket 121 is shown to include a multitude of pin receiving openings 151 adapted to have inserted therein an associated pin 251 of CPU 201 of FIG. 2B. It is noted that the number of pin receiving openings 151 is equivalent to the number of pins 251 on CPU 221. It is further noted that the number of pin receiving openings 151 is exemplary in nature and should not be construed as a limitation. The number of pin receiving openings 151 range from as few as forty, for legacy processors, to many hundreds or even thousands for state of the art sockets 121. CPU socket 121 also includes an opening 161 which is a void in the structure of CPU socket 121 which provides a non-contact area for a region 261 of CPU 201 of FIG. 2B when inserted into CPU socket 121.

Figure 2B:
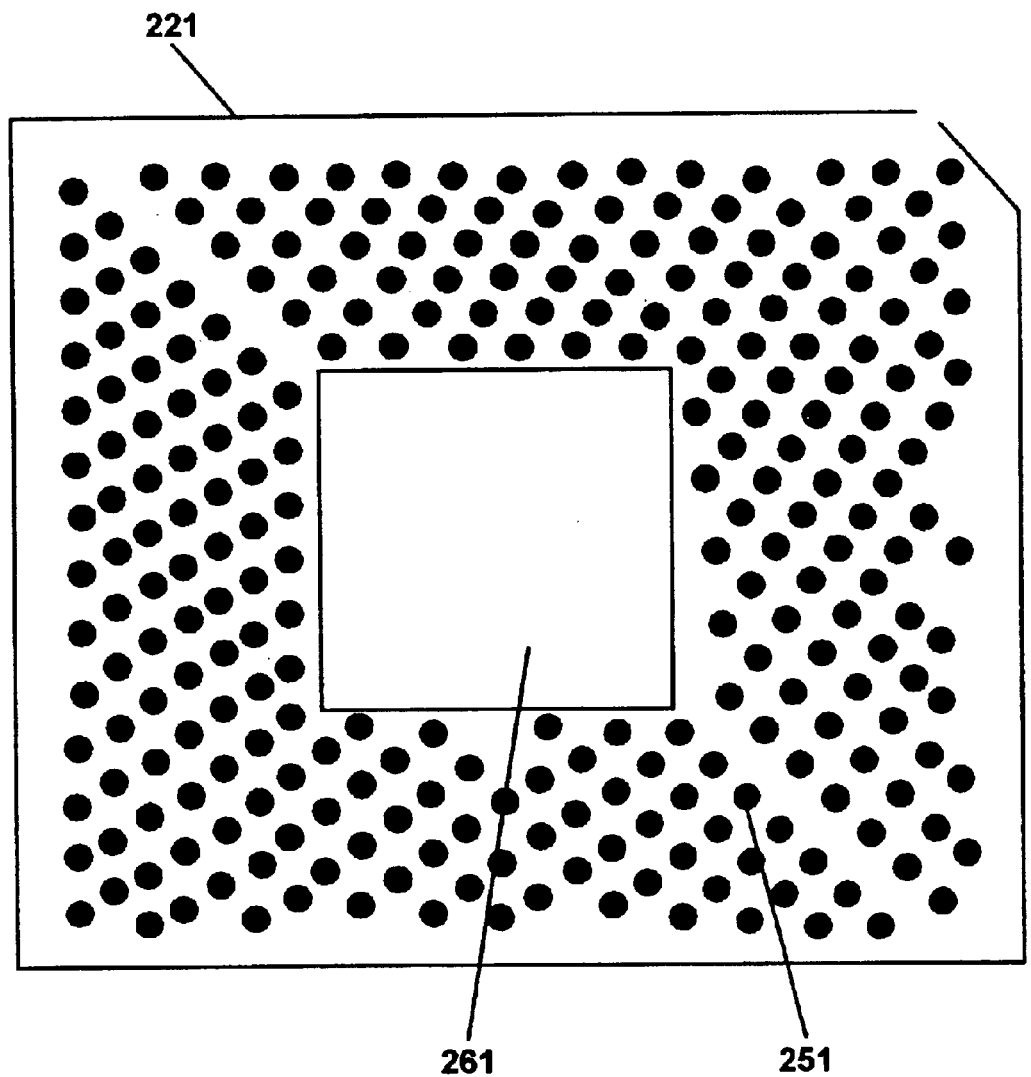
FIG. 2B is an illustration of an electronic component insertable into a receiving component, in accordance with one embodiment of the present invention.

FIG. 2B is an expanded view of a CPU (central processing unit) 221 that is adapted to be inserted into a CPU socket, e.g., CPU socket 121 of FIG. 2A. CPU 201 shows a multitude of pins 251 that correspond to a reciprocal pin receiving opening 151 on CPU socket 121 of FIG. 2A. CPU 221 is adapted to be inserted into CPU socket 121. Also included in CPU 221 is region 261, in which L2 cache and the actual processor are disposed. Region 261 is adapted to be placed within opening 161 of CPU socket 121 of FIG. 2A. The number of pins 251 range from as few as forty, for legacy processors, to many hundreds or even thousands for state of the art CPUs 221.

Figure 3:
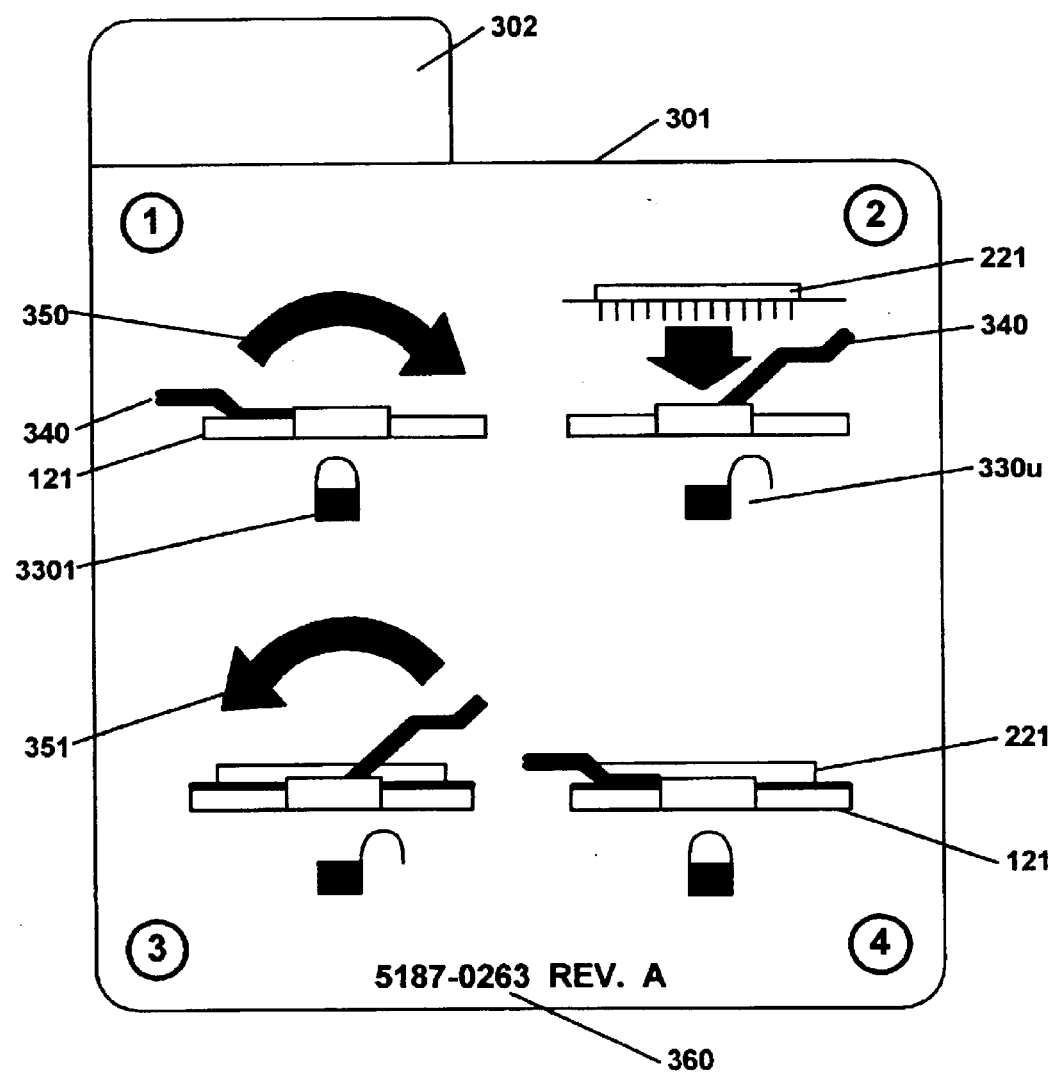
FIG. 3 is an illustration of one embodiment of the present invention in accordance with one embodiment of the present invention.

FIG. 3 is an illustration of an installation instruction conveyance device 300. In one embodiment, installation instruction conveyance device 300 is an installation label 301. Label 301, in one embodiment, has a tab 302 which provides easy handling when being initially disposed upon a socket 121. Label 301, in one embodiment, has linear dimensions equivalent to a socket 121 upon which it is disposable, thus covering pin receiving openings 151, thereby preventing loose impediments from being lodged therein. By protecting pin receiving opening 161 from loose impediments, a reduction in incorrect installations of CPUs 221 is realized.

Still referring to FIG. 3, label 301, shows a plurality of pictograms graphically depicting the installation sequence (pictograms 1, 2, 3, and 4) necessary for proper installation of a CPU 221 into a socket 121, in one embodiment of the present invention. Clockwise, from the upper left, Pictogram 1 shows a graphic representing a receiving socket, e.g., socket 121 of FIGS. 1 and 2A. Pictogram 1 also shows a representation of a locked padlock 3301 and a lever 340, shown in a locked position. Also shown is a rotational arrow 350 that indicates required left to right rotational movement of lever 340 for unlocking, and thus enabling installation of insertable component into socket 121.

Pictogram 2 of FIG. 3 shows an insertable component, e.g., CPU 221 that can be installed in socket 121. Lever 340 is now shown in an open position, and accordingly padlock 3301 is now shown as unlocked padlock 330u. Pictogram 2 depicts component 221 being inserted in a downward motion into socket 121.

Pictogram 3 of FIG. 3 shows component 221 inserted into socket 121. Lever 340 is still in an open position and padlock 330 is still shown as unlocked padlock 330u. To place lever 340 in a locked position, level 340 is rotated in a right to left direction, as shown by arrow 351.

Pictogram 4 shows lever 340 in a closed position. When lever 340 is in a locked position, disengagement of component 221 from socket 121 is prevented.

Toward the bottom of FIG. 3 is a reference number 350, in one embodiment of the present invention. Reference number 350 is, in one embodiment, utilized as an identifier for a type of receiving component, e.g., CPU socket 121. In another embodiment, reference number 350 is utilized as an identifier for a type of installable component, e.g., CPU 221.

Still referring to installation instruction conveyance device 300 of FIG. 3, the material used in the fabrication of label 301 is Lexan, created by General Electric. In one embodiment, Lexan 8B35 is used. In another embodiment, alternative types of Lexan can be used. In another embodiment, alternative polycarbonate materials can be used. However, it is noted that when alternative materials are used in lieu of Lexan, those materials are required to meet or exceed a UL (underwriters laboratories) 94 VTM2 specification, analogous to the properties of Lexan 8B35.

Additionally, in one embodiment, the background color of device 300 is white while the graphics are printed in black. In another embodiment, alternative contrasting colors, such as red and yellow can be used. It is noted that nearly any color or shades thereof can be used.

In one embodiment, an adhesive mechanism is disposed on the reverse side of device 300 to provide adhesive functionality to device 300. In one embodiment, the adhesive mechanism is an adhesive, e.g., 3M-467 type adhesive, manufactured by Minnesota Mining and Manufacturing of Minnesota. Although alternative adhesives can be used, it is noted that those alternative adhesives need to have physical properties analogous to 3M-467 type adhesive. 3M-467 type adhesive provides residueless removal, such that when device 300, previously disposed upon socket 121 is removed, all traces of 3M-467 type adhesive remain on device 300, thus allowing complete and proper installation of component 221.

Figure 4:
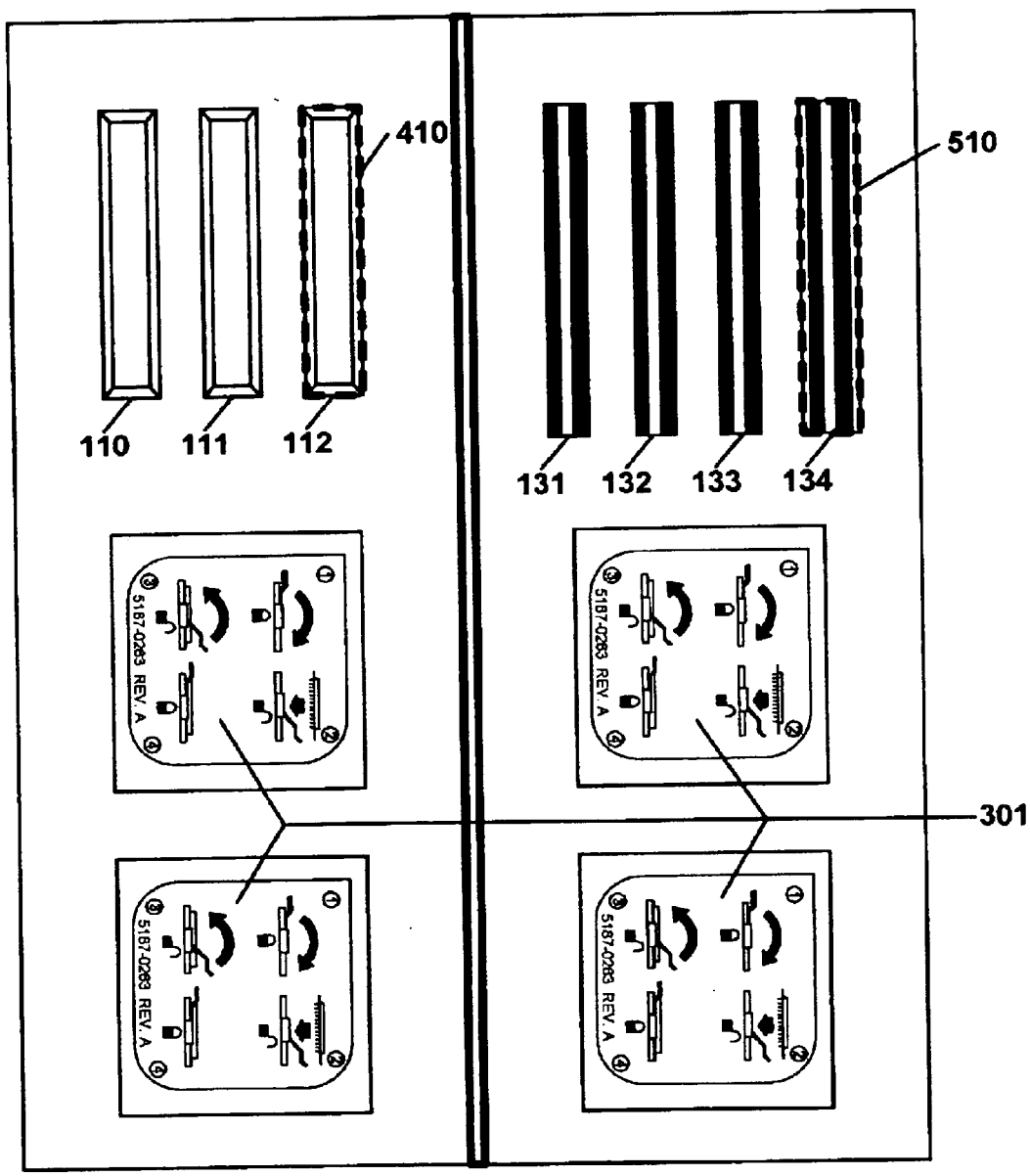
FIG. 4 is an illustration of an implementation of one embodiment of the present invention showing a multiple instantiation, in accordance with one embodiment of the present invention.

FIG. 4 is an analogous illustration of the printed circuit board 100 shown with a plurality of installation instruction conveying devices 300 disposed upon each receiving component 120–123, in one embodiment of the present invention. Although FIG. 4 depicts each device 300 facing analogously, in another embodiment, devices 300 may be rotated such that each is facing differently from the other.

Although device 300, e.g., label 301 is shown, in one embodiment, in a substantially square shape, in another embodiment, label 301 can be of alternative shapes, such as more rectangular, longer that wider or vice versa. Thus, device 300, in another embodiment, can be disposable upon memory slots 110–112, as indicated by dashed line 410 shown disposed upon memory slot 112, and as described as label 510 in FIG. 5A. In yet another embodiment, device 300 can be disposed upon expansion slots 131–134, as indicated by dotted line 430 upon expansion slot 134, and as described as label 530 of FIG. 5B. Thus, embodiments of the present invention are well suited for implementation upon nearly any receiving component so as to provide installation instructions thereof while protecting the receiving component from incidental damage and loose impediments.

Figure 5A:
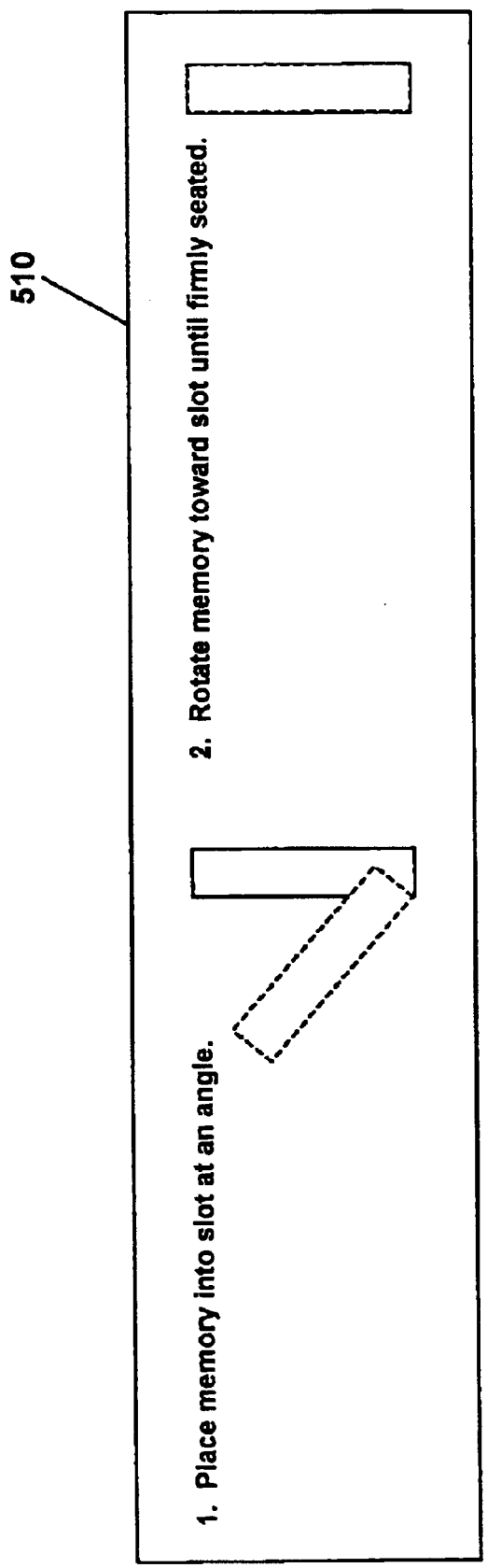
FIG. 5A is an illustration of an another embodiment of the present invention in accordance with one embodiment of the present invention.

FIG. 5A shows an installation instruction conveyance device, e.g., label 510 that can be disposed upon a memory slot, e.g., memory slot 112 of FIG. 4, in another embodiment of the present invention. Label 510 is shaped to approximate the shape of memory slot 112. Label 510 has both text-based instructions and graphical representations related to the provided text disposed thereon. It is noted that label 510 would be previously disposed upon the memory slots and would thus prevent installation of the memory into the memory slot until label 510 is removed. Further, label 510 provides a measure of protection against loose impediments being lodged in a memory slot.

Figure 5B:
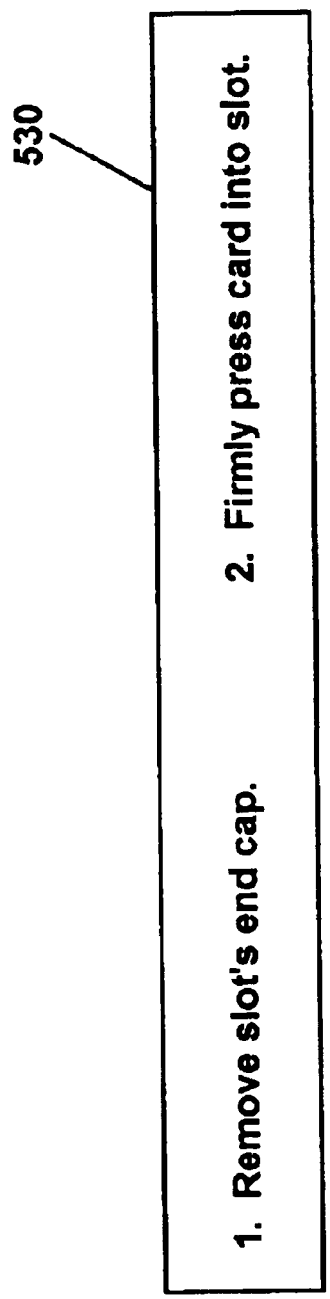
FIG. 5B is an illustration of an another embodiment of the present invention in accordance with one embodiment of the present invention.

FIG. 5B shows an installation instruction conveyance device, e.g., label 530, that is disposable upon an expansion slot, e.g., expansion slot 134 of FIG. 4, in another embodiment of the present invention. Label 530, in this instance, is shaped to approximate the size and shape of an expansion slot upon which it can be disposed. In the present embodiment, label 530 has text based installation instructions disposed thereon. It is noted that label 530 would be previously disposed upon the expansion slots and would thus prevent installation of an expansion card into the expansion slot until label 530 is removed. Further, label 530 provides a measure of protection against loose impediments being lodged in an expansion slot.

FIG. 6 is a flowchart 600 of steps performed in providing an installation instruction conveyance device in accordance with one embodiment of the present invention.

In step 602 of FIG. 6, a conveying device, e.g., device 300, that displays installation instructions pertaining to installing a component, e.g., CPU 221 of FIG. 2B, at a component installation location, e.g., socket 121 of FIG. 2A, is provided. The conveying device is adapted to be disposed upon the component installation location, e.g., device 300 upon socket 124 of FIG. 4, and when so disposed, e.g., conveying device 300 of FIG. 3 on socket 124 of FIG. 4, installation of the component at the component installation location is prevented. In one embodiment, the installation instructions displayed upon device 300 can be pictograms, as shown on label 301 of FIG. 3. In another embodiment, the installation instructions viewable on device 300 can be a combination of text-based instructions and graphical representations thereof, as shown on label 510 of FIG. 5A. In yet another embodiment, the installation instructions viewable on device 300 can be text-based instructions, as shown on label 530 of FIG. 5B. Further, by virtue of device 300, e.g., labels 301, 510, and 530, being disposed at the component installation location, the installation instructions disposed thereon are viewed prior to removal.

In step 604 of FIG. 6, the conveying device is adapted to be removed from the component installation location, and when so removed, allows installation of a component, e.g., CPU 221 of FIG. 2B, at a component installation location, e.g., socket 121 of FIG. 2A. Because removal of device 300 is mandated before installation, a technician/user will inherently view the installation instructions prior to the installation, thus realizing a reduction in improper installation.

Thus, embodiments of the present invention are drawn to providing an installation instruction conveyance device, e.g., device 300, that is readily viewable to a consumer/user/technician. Further, by virtue of disposing device 300 upon a receiving component, device 300 must be removed prior to installation of a component therein, the installation instructions are inherently viewed, thus reducing instances of improper installation. Additionally, by disposed device 300 upon a receiving component, device 300 provides a measure of protection against loose impediment being lodged therein.

The foregoing description of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilized the invention and various embodiments with various modifications as are suited to the particular use contemplated. It is intended that the scope of the invention be defined by the claims appended hereto and their equivalents.

What is claimed is:

1. A installation instruction conveying device comprising:
    a first surface having instructions visibly disposed thereon for installing a component; and
    means for adhering said installation instruction conveying device to a component installation location,
    wherein said installation instruction conveying device prevents installation of said component at said component installation location unless said installation instruction conveying device is removed from said component installation location.

2. The device of claim 1 wherein said means for adhering said installation instruction conveying device comprises means enabling residueless removal of said device from said component installation location.

3. The device of claim 1 wherein said instructions for said installation are conveyed using graphical representations thereof.

4. The device of claim 1 wherein said instructions for said installation are conveyed using alpha-numeric representations thereof.

5. The device of claim 1 wherein said instructions for said installation are conveyed using graphical and alpha-numeric representations thereof.

6. The device of claim 1 wherein said component is a central processing unit.

7. The device of claim 1 wherein said component installation location is a receiving socket.

8. The device of claim 1 wherein said installation instruction conveying device is further comprised of a polycarbonate material.

9. An installation instruction label comprising:
    a first side for displaying installation instructions, said installation instructions pertaining to installing a component at a component installation location; and
    a second side adheredly coupling said installation instruction label with said component installation location thereby preventing said installing of said component until said installation instruction label is removed from said component installation location.

10. The installation instruction label of claim 9 wherein said installation instructions are viewably disposed on said first side.

11. The installation instruction label of claim 9 wherein said second side comprises an adhering substance, said adhering substance comprising physical properties allowing residueless removal of said label from said a component.

12. The installation instruction label of claim 9 wherein said installation instructions are pictograms.

13. The installation instruction label of claim 9 wherein said installation instructions are text-based instructions.

14. The installation instruction label of claim 9 wherein said installation instructions are a combination of pictograms and text-based instructions.

15. The installation instruction label of claim 9 wherein said component is a central processing unit.

16. The installation instruction label of claim 9 wherein said component installation location is a socket adapted to receive a central processing unit.

17. The label of claim 9 wherein a polycarbonate material is used to fabricate said installation instruction label.

18. A method of providing installation instructions comprising:
    providing a conveying device which displays installation instructions pertaining to installing a component at a component installation location, said conveying device adapted to be disposed upon said component installation location, said conveying device preventing said installing said component at said component installation location while said conveyance device is disposed upon said component installation location; and
    wherein said conveying device is adapted to be removed from said component installation location, wherein said removal of said conveying device allows said installing of component at said component installation location.

19. The method as recited in claim 18 further comprising adheredly disposing said conveying device at said component installation location.

20. The method as recited in claim 18 wherein said conveying device is fabricated from a polycarbonate.

21. The method as recited in claim 18 wherein said component is a central processing unit.

22. The method as recited in claim 18 wherein said component installation location is a receiving socket.

23. The method as recited in claim 18 further comprising representing said installation instructions as a sequence of pictograms.

24. The method as recited in claim 18 further comprising representing said installation instructions as text-based installation instructions.

25. The method as recited in claim 18 further comprising representing said installation instructions as a combination of text-based installation instructions and sequenced pictograms.

* * * * *